Inventor
Edward E. Sawyer
By Spear, Rawlings & Spear.
Attorneys.

Patented Feb. 16, 1943

2,310,998

UNITED STATES PATENT OFFICE 2,310,998

SOUND RECORD AND METHOD OF MAKING THE SAME

Edward E. Sawyer, Waterville, Maine, assignor, by mesne assignments, to The Canal National Bank of Portland, Portland, Maine, a national banking association, as trustee Application May 27, 1941, Serial No. 395,418

4 Claims. (Cl. 18—48.5)

This invention relates to the manufacture of phonograph records from resin-bearing fibrous materials.

Heretofore attempts have been made to make such articles from laminated paper or board impregnated with rosin, bituminous materials and natural or synthetic resins.

Laminated paper and board as a base material is not suitable for this work, for in its manufacture inequalities, such as variations in thickness and formation always exist, and these inequalities result in areas having different degrees of hardness and resin absorption. Consequently the resin absorption varies with these factors and results in a non-uniformly impregnated sheet, and hence the reproduction of the sound track of the stamper is imperfect, due to these imperfections preventing the filling in of the areas deficient in resin and causing scratching and other undesired sounds when the record is played.

Moreover, the paper or board sheet has a decided grain, due to the fibres paralleling themselves in the direction of travel of the web as it is formed on the paper machine wire. This grain will cause the record blank which is stamped from the sheet to curl and render it useless for a single layer record. Accordingly, it has been the practice to superimpose several of these blanks as a multilayer record. This has necessitated placing the blanks with the grain at different angles to each other to counteract the curling tendency. This requires special care in assembling of the blanks and constitutes an additional operation in the manufacture of the record.

Furthermore, after the sheets are impregnated with the resin it is necessary to heat-treat them in order to harden the resin sufficiently to prevent lateral flow during the curing process. This involves still another manufacturing operation, requiring very careful supervision and control. Imperfect recording of the sound track also results, due to the inability of this hardened resin to always flow and completely fill the grooves of the stamper.

Other attempts to manufacture phonograph records have been made using paper or board as a base material and applying a surface coating of phonograph record compound, such as cellulose acetate, shellac, vulcanizable rubber, or resin compounds, either natural or synthetic. These materials are usually applied in a dry powdered form and cemented to the surface of the paper or board with suitable adhesives. After these surface coatings are cured, they are satisfactory for a short time, but soon crack, or even chip or peel, so that the usefulness of the record is destroyed.

These coating methods moreover, are costly in that they require special equipment and careful supervision. It is also difficult to apply a uniform surface layer of the dry powdered material and unless such layer is uniform the sound track of the finished record will be imperfect.

According to my invention I furnish a beating engine such as commonly used in the manufacture of paper pulp products with an aqueous mixture of fibres and finely divided dry synthetic resin. The beater completely and uniformly mixes these materials after which the mixture is withdrawn from the beater, diluted with water to the proper consistency, and delivered to the pulp tank of a pulp molding machine. The mixture is maintained in a continuous state of agitation in such tank so that the fibres in the mixture cannot attain any pronounced trend toward parallelism when deposited on the suction forming die of the machine. This results in the formation of a grainless article that has little or no tendency to curl after it has been removed from the suction die and dried. This drying is done at a temperature sufficiently low so that substantially no chemical change occurs in the finely divided resin which is uniformly distributed throughout the fibres of the molded article.

In this condition the dried preform or blank is placed between a pair of imperforate heated curing dies in which is mounted the negative or stamper.

This stamper is an electroplating which is taken from the surface of a wax or nitrate-coated aluminum disc on which the original recording has been cut. When pressure is applied to close the dies the heat causes the uniformly distributed resin to liquefy and under the pressure of the dies the molten resin is forced completely into every part of the sound track of the stamper as well as filling the interstices between the fibres.

The blank is held under pressure between the dies until the continued action of the heat has hardened the resin to its final infusible state whereupon the dies are opened and the finished article removed. If desired I may chill the article before opening the dies and removing it.

Inasmuch as the liquid resin is forced under pressure into every minute contour of the stamper before final hardening occurred, a perfect reproduction of the sound track is obtained, and any inequalities which may have existed in the thickness and formation of the original blank are automatically eliminated.

In my finished article the fluxed resin does not penetrate into the fibres themselves but forms a continuous phase in which the fibres are embedded. Thus the fibres form a reinforcing structure for the finished article giving it great strength.

My finished records may be dropped, or roughly handled without danger of breaking, as the impact strength is in the ratio of approximately five-to-one as compared with records made of ordinary thermo-setting molding compounds.

Other advantages will appear as the description proceeds:

Figure 1:
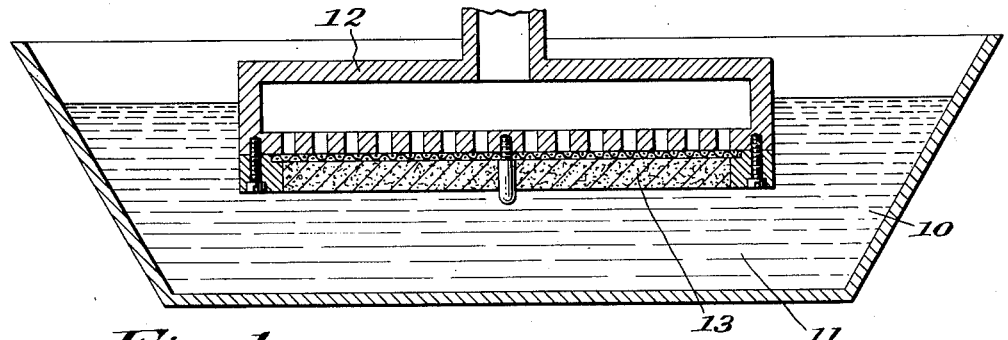
Fig. 1 is a section showing a foraminous forming die immersed in a pulp tank containing an aqueous mixture of fibres and synthetic resin for the suction formation of a blank or preform.
Figure 2:
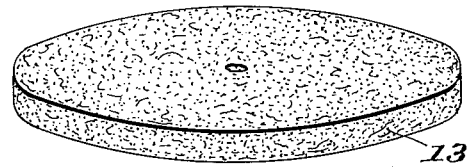
Fig. 2 is a perspective view of the blank or preform removed from the forming die of Fig. 1 and dried.

Referring to Fig. 1 I have indicated at 10 a tank containing an aqueous pulp mixture 11 consisting of water, fibres and comminuted water-insoluble thermo-setting synthetic resin.

I have indicated at 12 a forming die immersed in the pulp mixture for the suction formation of a blank or preform 13 thereon. After the forming die is withdrawn from the pulp mixture and the blank or preform 13 is partly drained of surplus water, said blank is removed from the forming die and dried in any suitable manner at a temperature insufficient to substantially change the chemical composition of the resin. In this dried condition it may be immediately cured or it may be stored and subsequently cured at a later date.

In the curing operation the dried blank or preform 13 is pressed between a pair of imperforate complemental curing dies 14 and 15 of a size and shape corresponding to that of the forming die on which the blank was formed. Either or both of the said dies may be heated in any desired manner as by steam in passages 16 and 17 in the die bodies. Either or both of the said dies are provided with a negative or stamper 18 containing a sound track 19.

The dies 14 and 15 are closed on the blank 13 under sufficient pressure to compact the blank.

In the curing operation the heat causes the resin to melt and under the pressure of the dies to completely fill the interstices of the fibrous structure and on the surface of the blank to completely fill the sound track of the stamper, thereby forming on the surface of the finished record 21 a sound track 20 which is an exact reproduction of the original recording.

Figure 3:
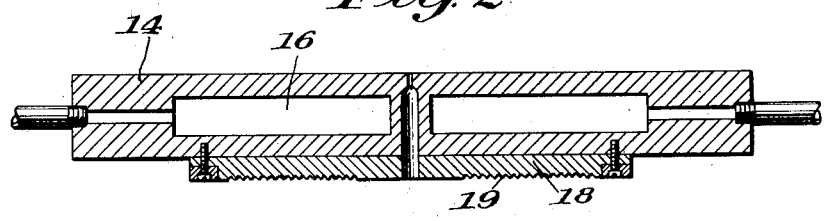
Fig. 3 is a section through a pair of complemental imperforate heated finishing and curing dies, one of which is equipped with a negative or stamper which when the dies are closed upon the blank or preform under heat and pressure causes the recording of the stamper to be molded on the surface of the record.
Figure 4:
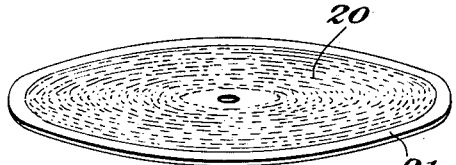
Fig. 4 is a view of a single layer finished article.
Figure 5:
Fig. 5 is an enlarged fragmentary section of the finished article shown in Fig. 4.
Figure 6:
Fig. 6 is a view similar to Fig. 5 but showing a double face single layer record.

If, as shown in Fig. 3, only one of the curing dies is provided with a stamper, a single face record 21 is obtained (see Fig. 5). If each curing die is provided with a stamper a double face record 22 is obtained (see Fig. 6).

The above described records are single layer records. In a single layer record it is essential that the resin fibre ratio be such that there be present a sufficient amount of fibres to give the required mechanical strength to the finished article and also a sufficient amount of resin to completely fill the contours of the stamper.

While the proportions of resin to fibre may vary, I have found that a single layer article containing approximately 60% to 70% of resin and 40% to 30% of fibre by weight produces a satisfactory sound record with requisite mechanical strength and satisfactory appearance.

There are advantages, however, in making the article of multilayer construction. In a multilayer article the body layer 23 contains less resin and more fibres than in the surface layer 24 and is of greater thickness than the surface layer. During the curing step, both layers are bonded to each other by a resinous bond which is furnished by the resin of both layers but is principally derived from the resin of the surface layer.

While proportions may vary, I have obtained satisfactory multilayer articles when the body layer contains approximately 25% resin and 75% fibres and the surface layer has approximately the same resin-fibre ratio as given for the single layer article.

Figure 7:
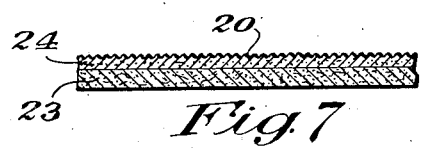
Fig. 7 is an enlarged section through a two-layer single faced record.

The above described two-layer article is a single face record (see Fig. 7). If a double face record is desired (see Fig. 8) I place an additional surface layer 25 corresponding to layer 24 on the bottom of the body layer 23 so that when the article is cured the sound tracks 20 will be formed on both surfaces of the record.

Figure 8:
Fig. 8 is an enlarged section through a three layer double faced record.

In making the multilayer articles of Figs. 7 and 8, the several layers are formed, dried and assembled, prior to curing, in the order desired to form the finished article, or the layers may be formed and assembled while wet on the molding machine and afterwards dried as a unit prior to curing.

If desired, the preforms may be arranged in their proper superimposed order and pressed between unheated imperforate dies so that the surface layers are lightly bonded to the body layer and any slight irregularities which may exist in the original dried preforms are eliminated. The resultant cold-pressed complete assembled article can thereafter be much more easily handled, is less bulky to ship or store, and enables a multi-cavity curing die to be more easily charged than if the preforms were to be placed in these die cavities as individual parts of the article.

What I therefore claim and desire to secure by Letters Patent is:

1. The method of making a sound record, comprising immersing a foraminous suction forming die in an aqueous pulp mixture containing a substantial amount of comminuted water insoluble uncured synthetic resin and a smaller amount of fibres to form on said die a wet grainless resin-bearing fibrous pulp article in which the particles of resin are enmeshed in the fibrous structure of the article and are physically and chemically unchanged from their original state, removing said article from the forming die and drying it at a temperature insufficient to appreciably change the chemical composition of the resin, placing the article between a pair of complemental imperforate curing dies, one of which is provided with a stamper having a sound track and one or both of which are supplied with heat sufficient to melt the resin, closing the dies to place sufficient pressure upon the article to compact it to the desired thickness and to force the melted resin into the interstices of the fibrous framework and the sound track of the stamper, and maintaining the heat and pressure until the resin has hardened and a permanent recording of the sound track has been molded in the surface of the record.

2. The method of making a sound record, comprising immersing foraminous suction forming dies in aqueous pulp mixtures one of which contains a substantial amount of comminuted water insoluble uncured synthetic resin and a smaller amount of fibres and the other of which contains a small amount of water insoluble comminuted uncured synthetic resin and a substantial amount of fibres to form on said dies wet grainless resin-bearing fibrous pulp layers in which the particles of resin are enmeshed in the fibrous structure of the layers and are physically and chemically unchanged from their original state, removing said layers from the forming dies and drying them at a temperature insufficient to appreciably change the chemical composition of the resin, placing the layers between a pair of complemental imperforate curing dies, one of which is provided with a stamper having a sound track and one or both of which are supplied with heat sufficient to melt the resin, closing the dies to place sufficient pressure upon the article to compact it to the desired thickness and to force the melted resin into the interstices of the fibrous framework and the sound track of the stamper, and maintaining the heat and pressure until the resin has hardened and a permanent recording of the sound track has been molded in the surface of the record.

3. A sound record having a sound track molded therein, comprising a body die molded from an aqueous fibrous pulp mixture containing fibres and uncured synthetic resin in which particles of resin are enmeshed in the fibrous structure of the body and are physically and chemically unchanged from their original state, said body being dried and compacted and finished under sufficient heat and pressure to cure the resin uniformly throughout the fibrous framework of the body and to furnish at the surface of the article a hard infusible film of cured resin in which a sound track is molded, the interfelting of the fibres in said body being such as to produce a grainless non-warping structure.

4. A sound record, comprising a body layer and a superimposed surface layer having a sound track molded therein, said layers die-molded from aqueous fibrous pulp mixtures containing fibres and an uncured synthetic resin in which the particles of resin are enmeshed in the fibrous structure of the layers and are physically and chemically unchanged from their original state, said body being dried and compacted and finished under sufficient heat and pressure to cure the resin uniformly throughout the fibrous framework of said layers, and to furnish at the surface of the article a hard infusible film of cured resin in which a sound track is molded, the proportion of resin to fibre in said surface layer being appreciably greater than in said body layer, and said layers being cementitiously united to each other by a resin bond, and the interfelting of the fibres in each layer being such as to produce a grainless non-warping structure.

EDWARD E. SAWYER.